(12) United States Patent
Beers et al.

(10) Patent No.: US 10,077,112 B2
(45) Date of Patent: Sep. 18, 2018

(54) CABIN SUPPLY DUCT

(71) Applicant: HAMILTON SUNDSTRAND CORPORATION, Windsor Locks, CT (US)

(72) Inventors: Craig M. Beers, Wethersfield, CT (US); Clarence J. Wytas, Stafford Springs, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 218 days.

(21) Appl. No.: 14/971,561

(22) Filed: Dec. 16, 2015

(65) Prior Publication Data

US 2017/0174347 A1 Jun. 22, 2017

(51) Int. Cl.
*F16L 9/00* (2006.01)
*B64D 13/00* (2006.01)
*B64D 13/06* (2006.01)

(52) U.S. Cl.
CPC ...... *B64D 13/00* (2013.01); *B64D 2013/0625* (2013.01)

(58) Field of Classification Search
CPC .................................................... F16L 41/021
USPC ...................... 138/177, 178, 109; 285/133.11
See application file for complete search history.

(56) References Cited

U.S. PATENT DOCUMENTS

| | | | | | |
|---|---|---|---|---|---|
| 582,910 | A | * | 5/1897 | Groshans | F16L 58/182 138/151 |
| 853,413 | A | * | 5/1907 | Kimche | E03C 1/122 285/129.1 |
| 1,627,928 | A | * | 5/1927 | Pressler | E03C 1/122 134/166 C |
| 4,976,307 | A | * | 12/1990 | Hall | F28F 11/02 138/89 |
| 8,002,314 | B2 | * | 8/2011 | Meyzaud | F16L 41/021 285/133.11 |
| 2007/0236010 | A1 | * | 10/2007 | Campau | F16L 25/0045 285/242 |
| 2014/0264116 | A1 | * | 9/2014 | Cappadora | F16L 13/08 251/148 |
| 2015/0240982 | A1 | * | 8/2015 | Eisner | F16L 41/021 166/305.1 |

\* cited by examiner

Primary Examiner — Patrick F Brinson
(74) Attorney, Agent, or Firm — Cantor Colburn LLP

(57) ABSTRACT

A cabin supply duct of an air conditioning and temperature control system including a first tubular body having an inlet, an outlet, an inner surface, an outer surface, and a longitudinal axis. A diameter of the inner surface at the first inlet being about 8.404±0.002 inches (21.346±0.005 centimeters). A second tubular body having an inlet, an outlet, an inner surface, an outer surface, and a longitudinal axis. A diameter of the outer surface of the second tubular body at the inlet being about 8.641±0.015 inches (21.948±0.038 centimeters). The inner surface of the second tubular body being fluidly connected to the inner surface of the first tubular body at the outlet of the second tubular body. The longitudinal axis of the first tubular body being perpendicular to the longitudinal axis of the second tubular body.

20 Claims, 8 Drawing Sheets

CABIN SUPPLY DUCT

BACKGROUND OF THE INVENTION

Embodiments of this invention generally relate to an aircraft air conditioning system, and more particularly, to a cabin supply duct of an aircraft air conditioning and temperature control system.

Aircraft include an air conditioning and temperature control systems (CACTCS) that provide conditioned air to passenger compartments, cockpits and the like. In many cases, engine compressor bleed air is supplied to the CACTCS. The temperature, pressure, and humidity of the bleed air generally depends upon which compressor extraction location is coupled to the CACTCS. In other cases, air for the CACTCS is provided by electrically driven compressors. In either case, the air is passed to portions of the aircraft through an outlet duct fluidly coupled to the compressor.

BRIEF DESCRIPTION OF THE INVENTION

According to one embodiment of the invention, a cabin supply duct of an air conditioning and temperature control system including a first tubular body having an inlet, an outlet, an inner surface, an outer surface, and a longitudinal axis. A diameter of the inner surface at the first inlet being about 8.404±0.002 inches (21.346±0.005 centimeters). A second tubular body having an inlet, an outlet, an inner surface, an outer surface, and a longitudinal axis. A diameter of the outer surface of the second tubular body at the inlet being about 8.641±0.015 inches (21.948±0.038 centimeters). The inner surface of the second tubular body being fluidly connected to the inner surface of the first tubular body at the outlet of the second tubular body. The longitudinal axis of the first tubular body being perpendicular to the longitudinal axis of the second tubular body. A distance between the inlet of the first tubular body and the longitudinal axis being about 7.702±0.1 inches (19.563±0.25 centimeters), as measured along the longitudinal axis of the first tubular body.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
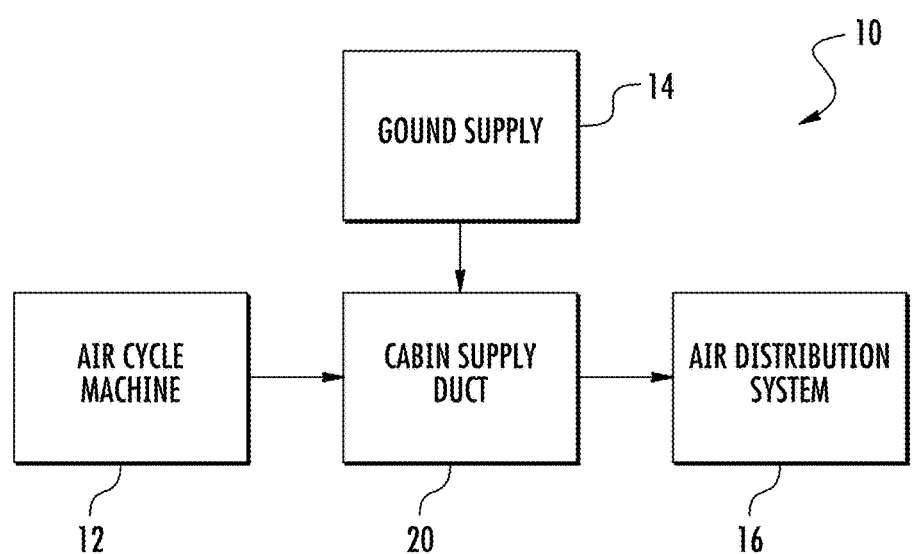
FIG. 1 is a schematic diagram of a cabin supply duct subsystem of an aircraft.

Referring now to FIG. 1, an example of a cabin supply duct subsystem 10 of a larger cabin air conditioning and temperature control system (CACTCS) pack is schematically illustrated. The subsystem 10 includes an air cycle machine 12 that provides conditioned air to an air distribution system 16 through a cabin supply duct 20. The air cycle machine 12 may condition air for both temperature and humidity. The air distribution system 16 distributes the conditioned air throughout the cabin of the aircraft, which includes the cockpit. Subsystem 10 also includes a ground supply 14 that provides conditioned air from a ground terminal typically at an airport gate to the air distribution system 16 through the cabin supply duct 20. The ground supply 14 alleviates the need to run the air cycle machine 12 while the aircraft is parked at a gate. The cabin supply duct 20 helps direct the airflow and reduce vibrational noise that is typically a byproduct of conditioned air from the air cycle machine 12 and ground supply 14.

Figure 2:
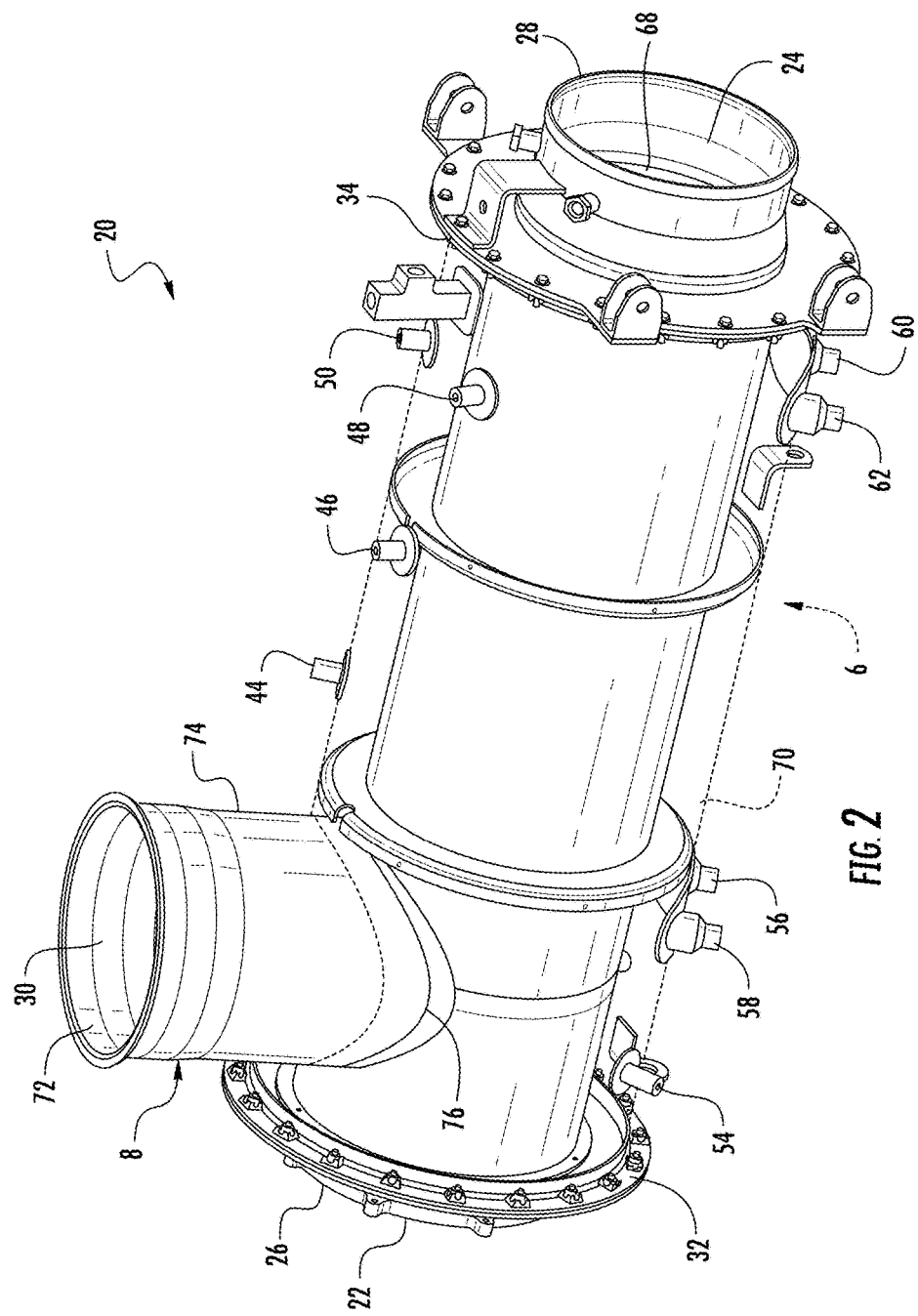
FIG. 2 is an isometric view of a cabin supply duct, according to an embodiment of the invention.
Figure 3:
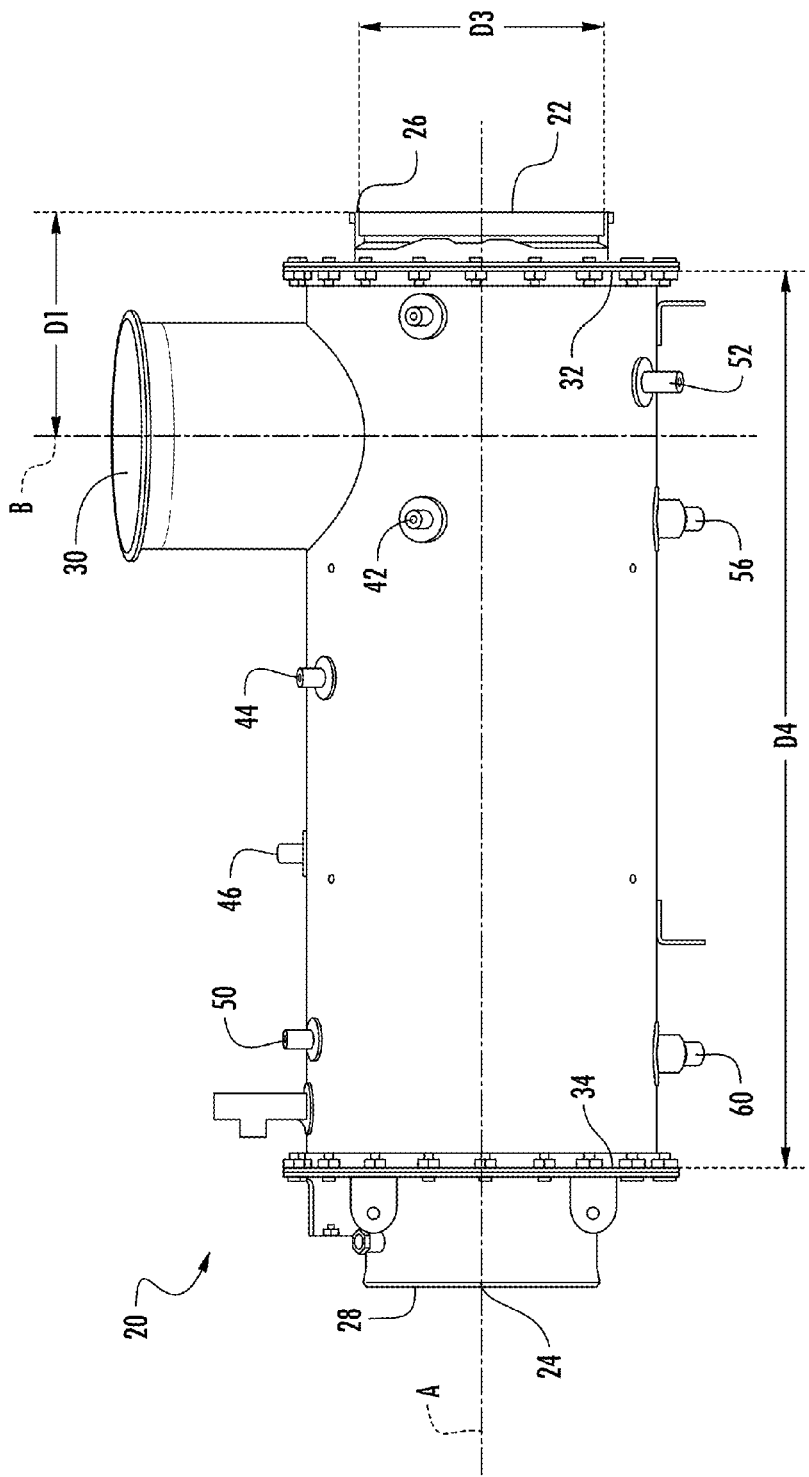
FIG. 3 is a side view of the cabin supply duct, according to an embodiment of the invention.

An example of a cabin supply duct 20 is shown in FIGS. 2 and 3, where the cabin supply duct 20 is tubular in shape. In the illustrated embodiment, the cabin supply duct 20 consists of two intersecting tubular bodies, a first tubular body 6 and a second tubular body 8. The first tubular body 6 is composed of an inlet 22, an outlet 24, an inner surface 68, an outer surface 70, and a longitudinal axis A. The inlet 22 is configured to receive conditioned air from the air cycle machine 12 and the outlet 24 is configured to distribute the conditioned air to the cockpit or cabin of an aircraft through the air distribution system 16. In one embodiment, the inlet 22 has an inner surface 68 diameter D3 of about 8.404±0.002 inches (21.346±0.005 centimeters), as seen in FIG. 3.

Figure 6:
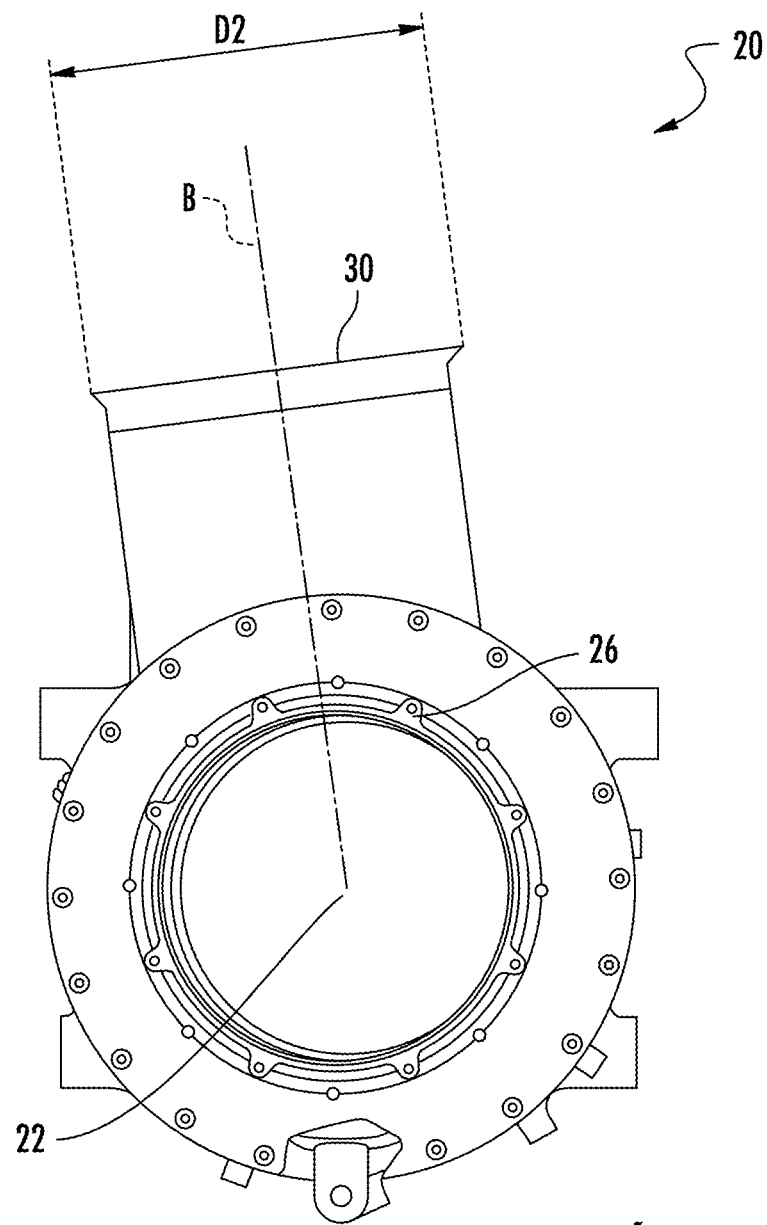
FIG. 6 is a view of the inlet of the cabin supply duct, according to an embodiment of the invention.

The second tubular body 8 is composed of an inlet 30, an outlet 76, an inner surface 72, an outer surface 74, and a longitudinal axis B. The inner surface 72 of the second tubular body 8 is fluidly connected to the inner surface 68 of the first tubular body 6 at the outlet 76. Longitudinal axis A is positioned perpendicular to longitudinal axis B, as can be seen in FIG. 3. The inlet 30 is configured to receive conditioned air from a ground supply 14 and distribute the conditioned air through the first tubular body 6 out the outlet 24 to the air distribution system 16. In another embodiment, the inlet 30 has an outer surface 74 diameter D2 of about 8.641±0.015 inches (21.948±0.038 centimeters), as seen in FIG. 6.

Referring now to FIG. 3. The cabin supply duct 20 includes an inlet surface 26 to line up flush with the connection to the air cycle machine 12. The cabin supply duct 20 also includes an outlet surface 28 to line up flush with the connection to the air distribution system 16. FIG. 3 shows a longitudinal axis A that travels through the first tubular body 6 from the center point of inlet 22 to the center point of the outlet 24. FIG. 3 shows a longitudinal axis B that travels through the second tubular body 8 from the center point of the inlet 30 to the center point of the outlet 76. In one embodiment, a distance D1 between the inlet surface 26 and the B axis is about 7.702±0.1 inches (19.563±0.25 centimeters), as measured along the longitudinal axis A. FIG. 3 also shows an inward surface of a first flange 32 and an inward surface of a second flange 34 on the first tubular body 6. In one embodiment, a distance D4 between the inward surface of a first flange 32 and the inward surface of a second flange 34 is about 31.215±0.03 inches (79.286±0.08 centimeters), as measured along the longitudinal axis A.

Figure 4:
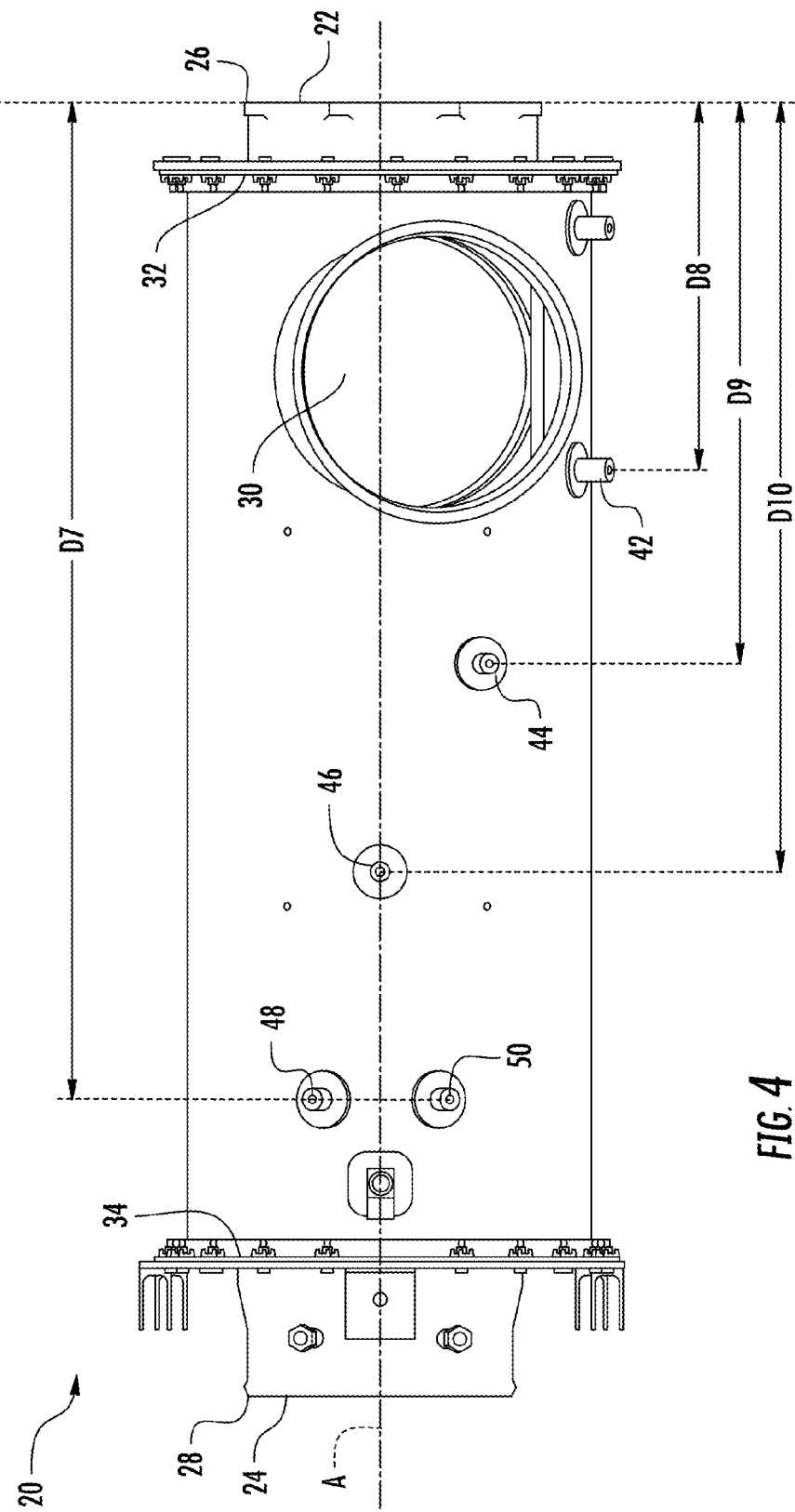
FIG. 4 is a top view of the cabin supply duct, according to an embodiment of the invention.

Referring now to FIGS. 2, 3, and 4, the cabin supply duct 20 includes a series of integrated mounting bosses including: a first boss 42, a second boss 44, a third boss 46, a fourth boss 48, a fifth boss 50, a sixth boss 52, a seventh boss 54, an eighth boss 56, a ninth boss 58, a tenth boss 60, and an eleventh boss 62. The integrated mounting bosses are affixed to the outer surface 70 and provide mounting points for structural support of various CACTCS Pack components. The integrated mounting bosses may be configured in a variety of different configurations depending on the support required from the various CACTCS Pack components.

Referring now to FIG. 4, a top view of the cabin supply duct 20 is illustrated in more detail. In one embodiment, a distance D8 between the inlet surface 26 and the first boss 42 is about 10.51±0.15 inches (26.695±0.38 centimeters), as measured along the longitudinal axis A. In a second embodiment, a distance D9 between the inlet surface 26 and the second boss 44 is about 16.059±0.15 inches (40.790±0.38 centimeters), as measured along the longitudinal axis A. In a third embodiment, a distance D10 between the inlet surface 26 and the third boss 46 is about 22.059±0.15 inches (56.030±0.38 centimeters) as measured along the longitudinal axis A. In a fourth embodiment, a distance D7 between the inlet surface 26 and the fourth boss 48 is about 28.559±0.15 inches (72.540±0.38 centimeters), as measured along the longitudinal axis A. In a fifth embodiment, a distance D7 between the inlet surface 26 and the fifth boss 50 is about 28.559±0.15 inches (72.540±0.38 centimeters), as measured along the longitudinal axis A.

Figure 5:
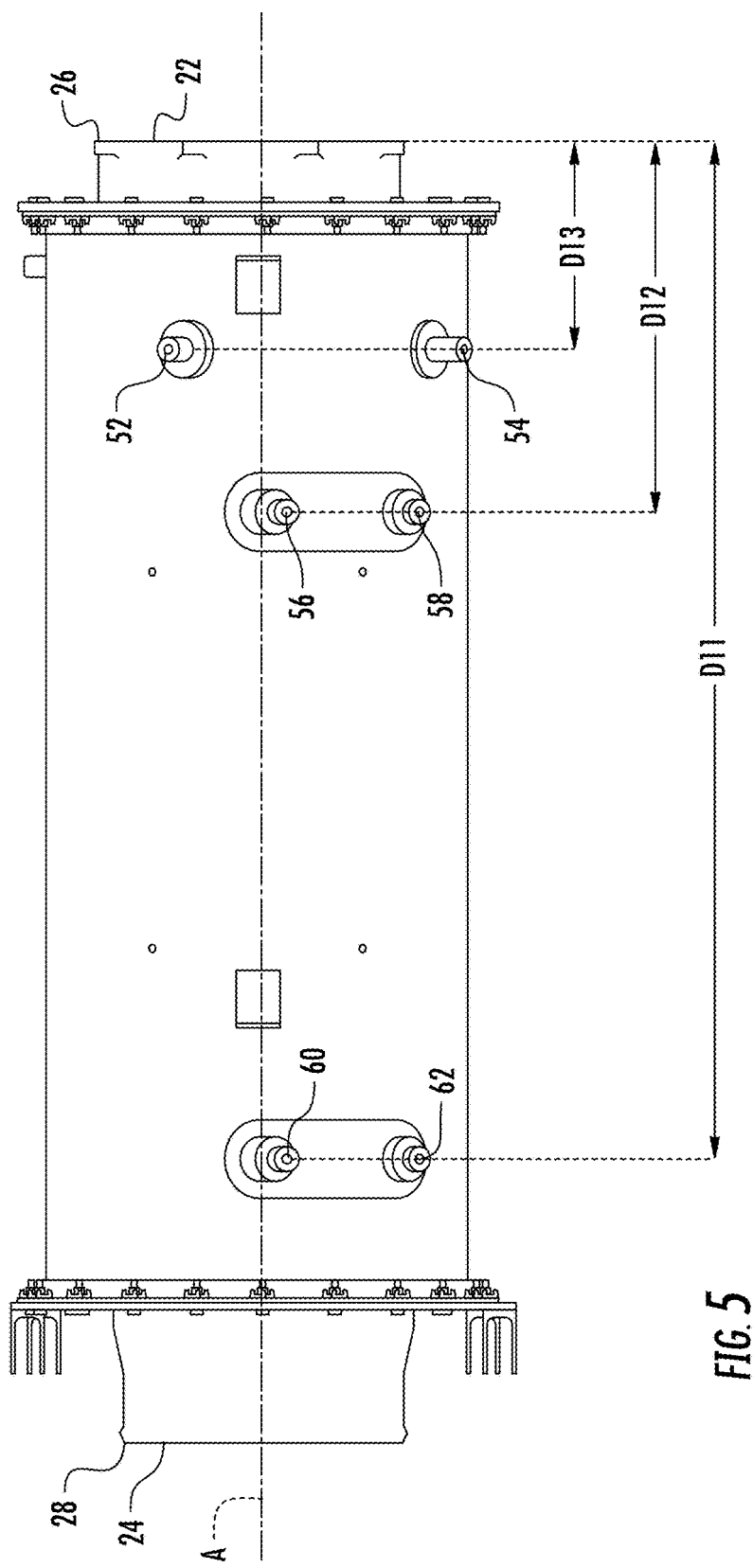
FIG. 5 is a bottom view of the cabin supply duct, according to an embodiment of the invention.

Referring now to FIG. 5, a bottom view of the cabin supply duct 20 is illustrated in more detail. In a sixth embodiment, a distance D13 between the inlet surface 26 and the sixth boss 52 is about 5.919±0.15 inches (15.034±0.38 centimeters), as measured along the longitudinal axis A. In a seventh embodiment, a distance D13 between the inlet surface 26 and the seventh boss 54 is about 5.919±0.15 inches (15.034±0.38 centimeters), as measured along the longitudinal axis A. In an eighth embodiment, a distance D12 between the inlet surface 26 and the eighth boss 56 is about 10.509±0.15 inches (26.693±0.38 centimeters), as measured along the longitudinal axis A. In a ninth embodiment, a distance D12 between the inlet surface 26 and the ninth boss 58 is about 10.509±0.15 inches (26.693±0.38 centimeters), as measured along the longitudinal axis A. In tenth embodiment, a distance D11 between the inlet surface 26 and the tenth boss 60 is about 29.009±0.15 inches (73.683±0.38 centimeters), as measured along the longitudinal axis A. In an eleventh embodiment, a distance D11 between the inlet surface 26 and the eleventh boss 62 is about 29.009±0.15 inches (73.683±0.38 centimeters), as measured along the longitudinal axis A.

Figure 7:
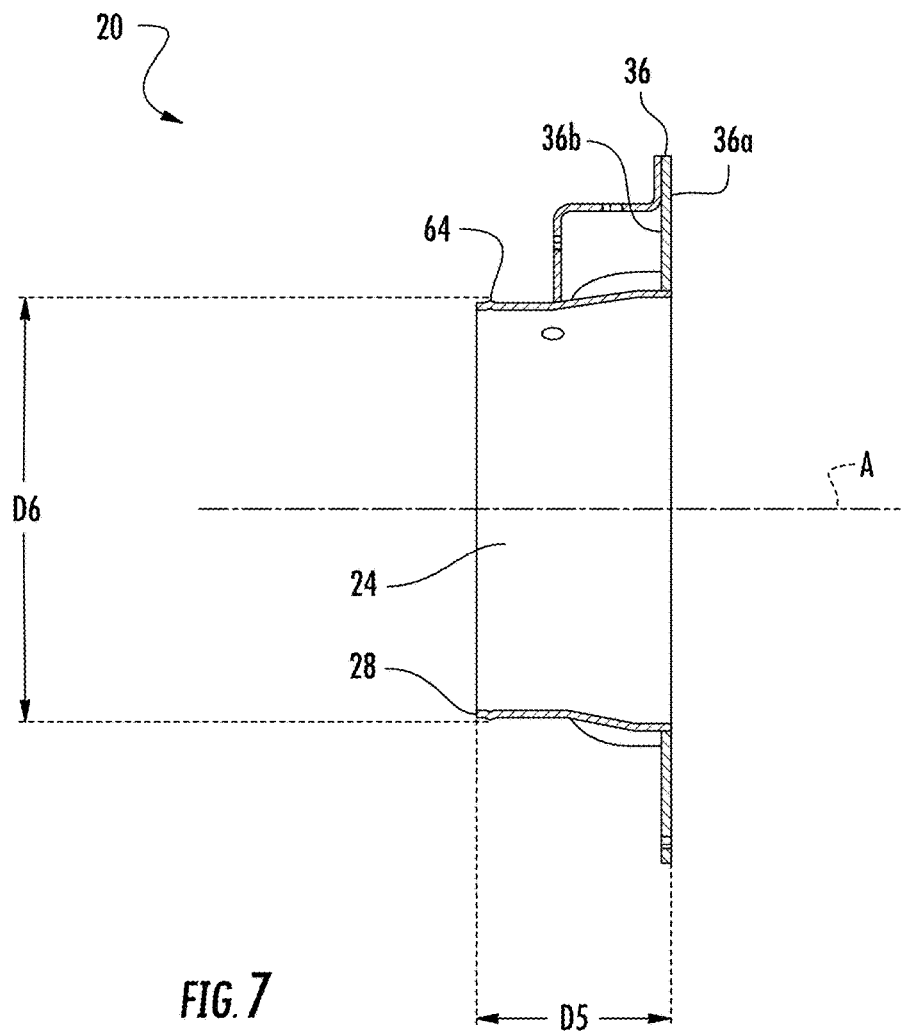
FIG. 7 is a magnified view of the outlet of the cabin supply duct, according to an embodiment of the invention.

Referring to FIG. 7, a magnified view of the outlet 24 of the cabin supply duct 20 is illustrated in more detail. In one embodiment, FIG. 7 shows a beaded tube end proximate to the outlet 24 of the first tubular body 6, where the bead 64 is designed per SAE AS5131B128. In another embodiment, the first tubular body 6 at the bead 64 has an outer surface 70 diameter D6 of about 8.242 inches±0.03 inches (20.935±0.08 centimeters). The first tubular body 6 of the cabin supply duct 20 includes a third flange 36 proximate to the outlet 24. The third flange 36 having an inward side 36*a* and an outward side 36*b*, the inward side 36*a* abutting the second flange 34, the second flange 34 being between the third flange 36 and the first flange 32. In yet another embodiment, a distance D5 between the outlet surface 28 and the inward surface 36*a* of the third flange 36 is about 3.790±0.03 inches (9.627±0.08 centimeters), as measured along the longitudinal axis A.

Figure 8:
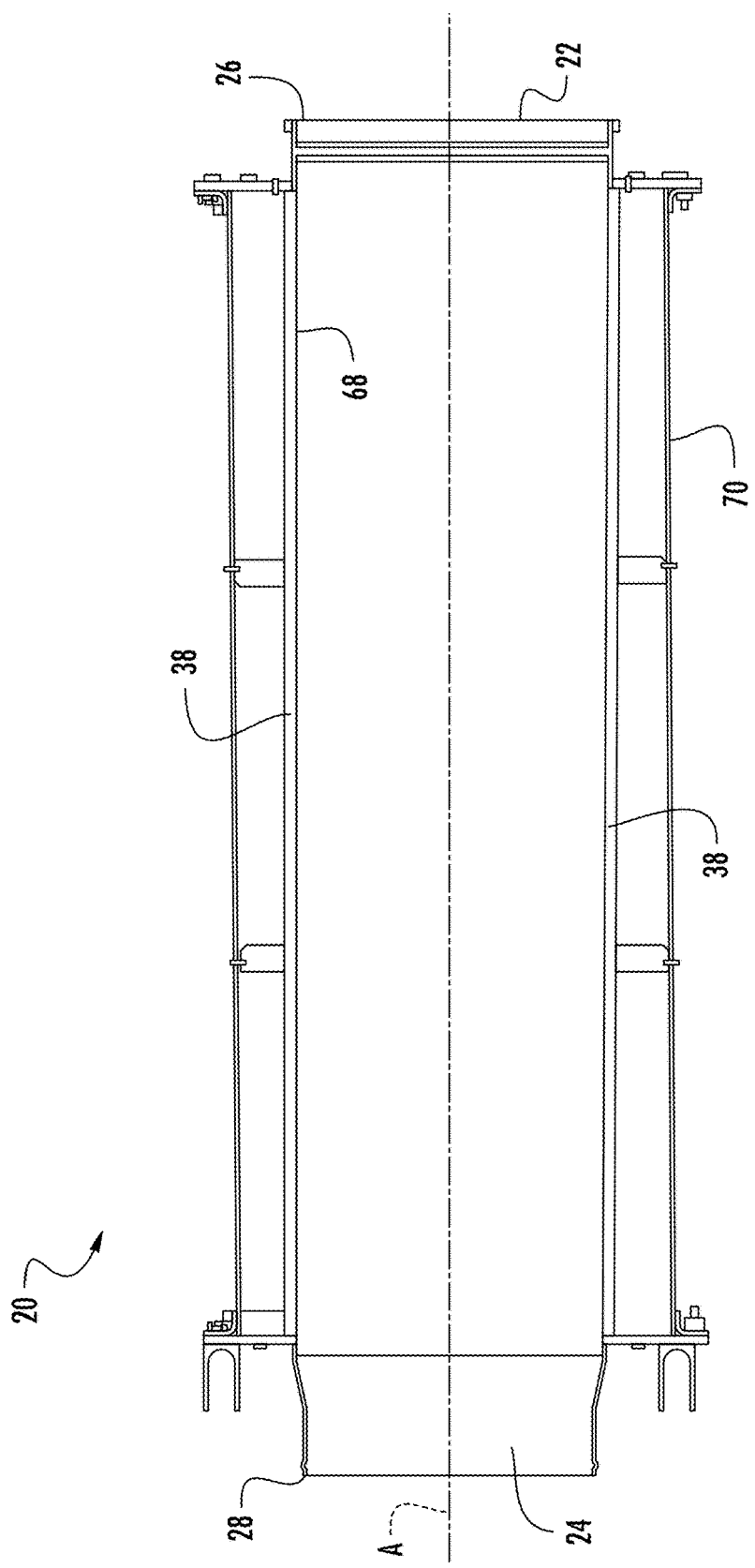
FIG. 8 is a cross-sectional side view of the cabin supply duct, according to an embodiment of the invention.

Referring to FIG. 8, a cross-sectional side view of a cabin supply duct 20, specifically the first tubular body 6 is illustrated in more detail. In one embodiment, FIG. 8 shows an acoustic liner 38 that is enclosed between an inner surface 68 and an outer surface 70 of the first tubular body 6. The purpose of the acoustic liner 38 is to reduce the vibrational noise that is typically a byproduct of conditioned air from the air cycle machine 12 or ground supply 14. In a further embodiment, the acoustic liner 38 is composed of acoustic fibrous aramid honeycomb per AMS3714 with 0.016 inches thick acoustic liner Feltmetal per D12-S3/1817.

The term "about" is intended to include the degree of error associated with measurement of the particular quantity based upon the equipment available at the time of filing the application. For example, "about" can include a range of ±8% or 5%, or 2% of a given value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A cabin supply duct of an air conditioning and temperature control system, comprising:
    a first tubular body having an inlet, an outlet, an inner surface, an outer surface, and a longitudinal axis, a diameter of the inner surface of the inlet being 8.404±0.002 inches (21.346±0.005 centimeters); and
    a second tubular body having an inlet, an outlet, an inner surface, an outer surface, and a longitudinal axis, a diameter of the outer surface of the inlet of the second tubular body being 8.641±0.015 inches (21.948±0.038 centimeters), the inner surface of the second tubular body being fluidly connected to the inner surface of the first tubular body at the outlet of the second tubular body, the longitudinal axis of the first tubular body being perpendicular to the longitudinal axis of the second tubular body,
    wherein a distance between the inlet of the first tubular body and the longitudinal axis of the second tubular body being 7.702±0.1 inches (19.563±0.25 centimeters), as measured along the longitudinal axis of the first tubular body, and
    wherein the first tubular body further includes:
        a first flange located proximate the inlet of the first tubular body and a second flange located proximate the outlet of the first tubular body, a distance between the first flange and the second flange being 31.215±0.03 inches (79.286±0.08 centimeters), as measured along the longitudinal axis of the first tubular body; and
        a third flange having an inward side and an outward side, the inward side abutting the second flange, the second flange being between the third flange and the first flange, a distance between the outlet of the first tubular body and the inward side of the third flange being 3.790±0.03 inches (9.627±0.08 centimeters), as measured along the longitudinal axis of the first tubular body.

2. The cabin supply duct according to claim 1, wherein the first tubular body further includes:
a first boss affixed to the outer surface of the first tubular body, a distance between the inlet of the first tubular body and the first boss being 10.51±0.15 inches (26.695±0.38 centimeters), as measured along the longitudinal axis of the first tubular body.

3. The cabin supply duct according to claim 2, wherein the first tubular body further includes:
a bead around the circumference of the first tubular body located proximate to the outlet of the first tubular body, the diameter of the outer surface of the first tubular body at the bead being 8.242±0.03 inches (20.93 5±0.08 centimeters).

4. The cabin supply duct according to claim 1, wherein the first tubular body further includes:
a second boss affixed to the outer surface of the first tubular body, a distance between the inlet of the first tubular body and the second boss being 16.059±0.15 inches (40.790±0.38 centimeters), as measured along the longitudinal axis of the first tubular body.

5. The cabin supply duct according to claim 1, wherein the first tubular body further includes:
a third boss affixed to the outer surface of the first tubular body, a distance between the inlet of the first tubular body and the third boss being 22.059±0.15 inches (56.030±0.38 centimeters), as measured along the longitudinal axis of the first tubular body.

6. The cabin supply duct according to claim 1, wherein the first tubular body further includes:
a fourth boss affixed to the outer surface of the first tubular body, a distance between the inlet of the first tubular body and the fourth boss being 28.559±0.15 inches (72.540±0.38 centimeters), as measured along the longitudinal axis of the first tubular body.

7. The cabin supply duct according to claim 1, wherein the first tubular body further includes:
a fifth boss affixed to the outer surface of the first tubular body, a distance between the inlet of the first tubular body and the fifth boss being 28.559±0.15 inches (72.540±0.38 centimeters), as measured along the longitudinal axis of the first tubular body.

8. The cabin supply duct according to claim 1, wherein the first tubular body further includes:
a sixth boss affixed to the outer surface of the first tubular body, a distance between the inlet of the first tubular body and the sixth boss being 5.919±0.15 inches (15.034±0.38 centimeters), as measured along the longitudinal axis of the first tubular body.

9. The cabin supply duct according to claim 1, wherein the first tubular body further includes:
a seventh boss affixed to the outer surface of the first tubular body, a distance between the inlet of the first tubular body and the seventh boss being 5.919±0.15 inches (15.034±0.38 centimeters), as measured along the longitudinal axis of the first tubular body.

10. The cabin supply duct according to claim 1, wherein the first tubular body further includes:
an eighth boss affixed to the outer surface of the first tubular body, a distance between the inlet of the first tubular body and the eighth boss being 10.509±0.15 inches (26.693±0.38 centimeters), as measured along the longitudinal axis of the first tubular body.

11. The cabin supply duct according to claim 1, wherein the first tubular body further includes:
a ninth boss affixed to the outer surface of the first tubular body, a distance between the inlet of the first tubular body and the ninth boss being 10.509±0.15 inches (26.693±0.38 centimeters), as measured along the longitudinal axis of the first tubular body.

12. The cabin supply duct according to claim 1, wherein the first tubular body further includes:
a tenth boss affixed to the outer surface of the first tubular body, a distance between the inlet of the first tubular body and the tenth boss being 29.009±0.15 inches (73.683±0.38 centimeters), as measured along the longitudinal axis of the first tubular body.

13. The cabin supply duct according to claim 1, wherein the first tubular body further includes:
an eleventh boss affixed to the outer surface of the first tubular body, a distance between the inlet of the first tubular body and the eleventh boss being 29.009±0.15 inches (73.683±0.38 centimeters), as measured along the longitudinal axis of the first tubular body.

14. A cabin supply duct of an air conditioning and temperature control system, comprising:
a first tubular body having an inlet, an outlet, an inner surface, an outer surface, and a longitudinal axis, a diameter of the inner surface of the inlet being 8.404±0.002 inches (21.346±0.005 centimeters);
a second tubular body having an inlet, an outlet, an inner surface, an outer surface, and a longitudinal axis, a diameter of the outer surface of the inlet of the second tubular body being 8.641±0.015 inches (21.948±0.038 centimeters), the inner surface of the second tubular body being fluidly connected to the inner surface of the first tubular body at the outlet of the second tubular body, the longitudinal axis of the first tubular body being perpendicular to the longitudinal axis of the second tubular body, wherein a distance between the inlet of the first tubular body and the longitudinal axis of the second tubular body being 7.702±0.1 inches (19.563±0.25 centimeters), as measured along the longitudinal axis of the first tubular body; and
an acoustic liner located between the inner surface and the outer surface of the first tubular body.

15. The cabin supply duct according to claim 14, wherein the first tubular body further includes:
a first flange located proximate the inlet of the first tubular body and a second flange located proximate the outlet of the first tubular body, a distance between the first flange and the second flange being 31.215±0.03 inches (79.286±0.08 centimeters), as measured along the longitudinal axis of the first tubular body.

16. The cabin supply duct according to claim 14, wherein the first tubular body further includes:
a third flange having an inward side and an outward side, the inward side abutting the second flange, the second flange being between the third flange and the first flange, a distance between the outlet of the first tubular body and the inward side of the third flange being 3.790±0.03 inches (9.627±0.08 centimeters), as measured along the longitudinal axis of the first tubular body.

17. The cabin supply duct according to claim 14, wherein the first tubular body further includes:
a first boss affixed to the outer surface of the first tubular body, a distance between the inlet of the first tubular body and the first boss being 10.51±0.15 inches (26.695±0.38 centimeters), as measured along the longitudinal axis of the first tubular body.

18. The cabin supply duct according to claim 14, wherein the first tubular body further includes:
a bead around the circumference of the first tubular body located proximate to the outlet of the first tubular body, the diameter of the outer surface of the first tubular body at the bead being 8.242±0.03 inches (20.935±0.08 centimeters).

19. The cabin supply duct according to claim 14, wherein the first tubular body further includes:
a second boss affixed to the outer surface of the first tubular body, a distance between the inlet of the first tubular body and the second boss being 16.059±0.15 inches (40.790±0.38 centimeters), as measured along the longitudinal axis of the first tubular body.

20. The cabin supply duct according to claim 14, wherein the first tubular body further includes:
a third boss affixed to the outer surface of the first tubular body, a distance between the inlet of the first tubular body and the third boss being 22.059±0.15 inches (56.030±0.38 centimeters), as measured along the longitudinal axis of the first tubular body.

* * * * *